Dec. 20, 1949  G. A. LYON  2,491,507
APPARATUS FOR MAKING FLAT PLASTIC ARTICLES
Filed March 11, 1946  6 Sheets-Sheet 5
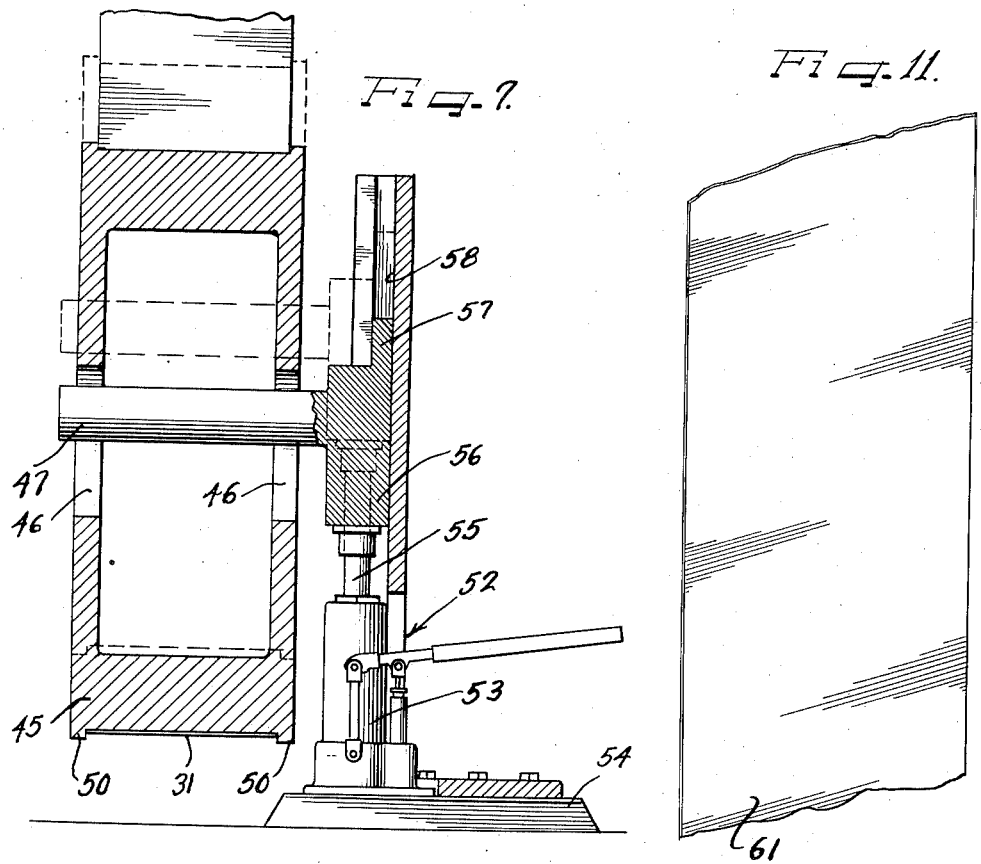
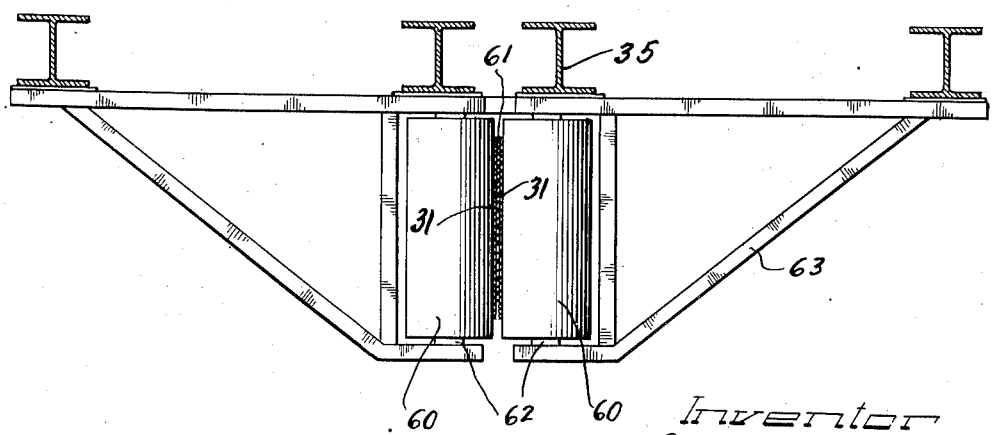
Inventor
GEORGE ALBERT LYON Dec. 20, 1949 G. A. LYON 2,491,507
APPARATUS FOR MAKING FLAT PLASTIC ARTICLES
Filed March 11, 1946 6 Sheets-Sheet 6
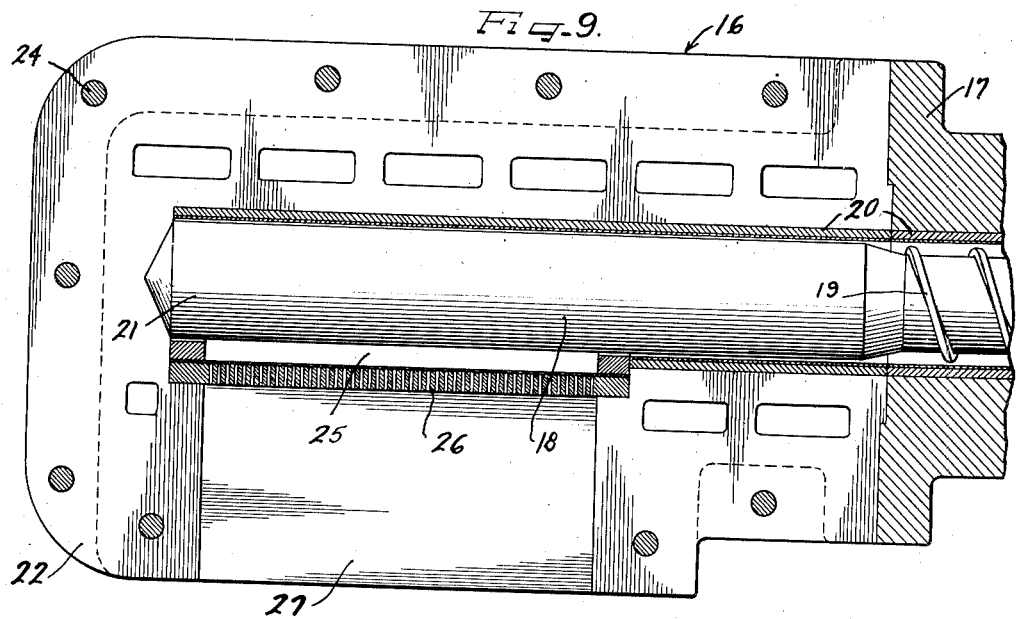
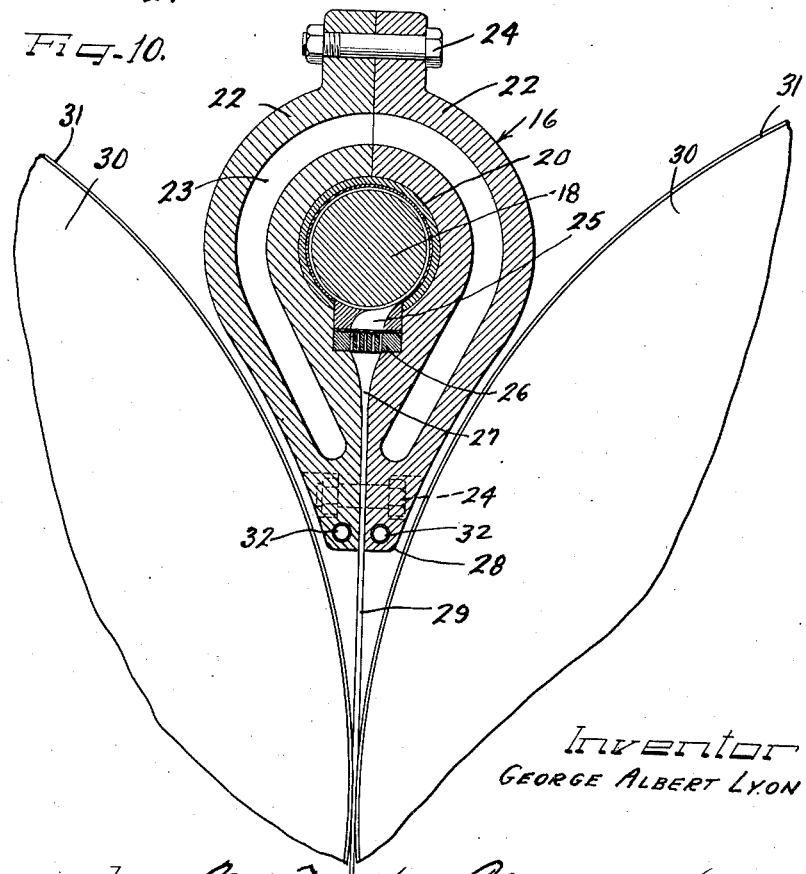
Inventor
GEORGE ALBERT LYON Patented Dec. 20, 1949

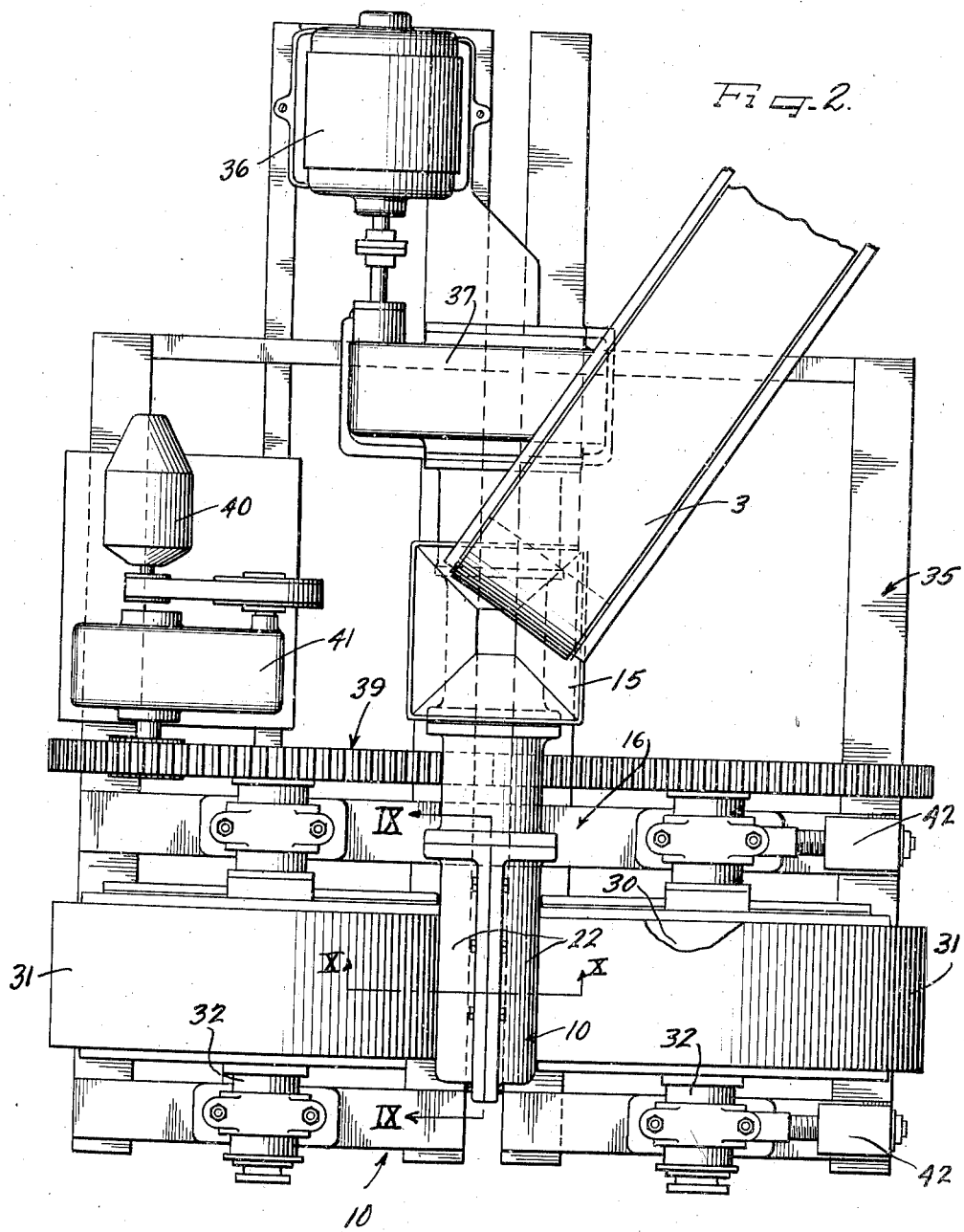

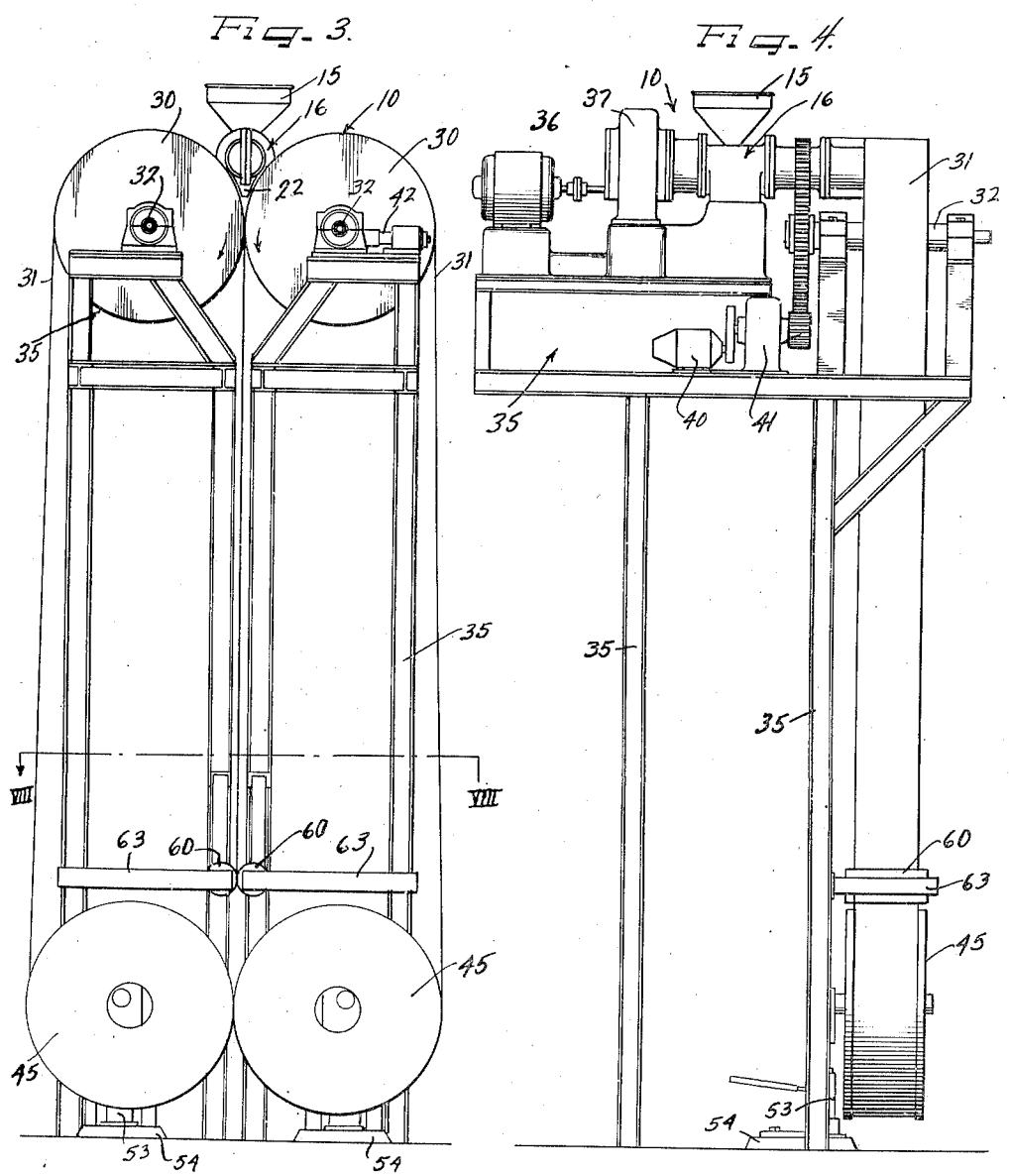

2,491,507

UNITED STATES PATENT OFFICE 2,491,507

APPARATUS FOR MAKING FLAT PLASTIC ARTICLES

George Albert Lyon, Allenhurst, N. J.

Application March 11, 1946, Serial No. 653,656

13 Claims. (Cl. 18—12)

1

This invention relates to the forming of synthetic plastic sheet-like material and articles, and more particularly to an apparatus for forming continuous plastic sheet from plastic mix.

In the fabrication of plastic sheeting at the present time two different methods of manufacturing such sheeting are employed. In one of them the sheet is formed by calendering rolls. Such calendered stock however does not possess a smooth surface finish on account of the tacky material tending to adhere to the rolls as the sheet is stripped therefrom. In the other method the plastic is liquified in a solvent and is allowed to solidify on a polished plate or drum. Such a method, however, is not economical as sheeting produced by that method is too costly for use in the manufacture on a large production scale of automobile parts normally made from cheap steel sheet.

It is accordingly the aim of this invention to provide a new apparatus for making plastic sheet which will provide a highly polished sheet on a sufficiently economical basis that the sheet can be used as a substitute for steel sheet in automobile parts, such as hub caps, wheel covers and the like.

Another object of this invention is to provide an improved apparatus for manufacturing plastic sheet from synthetic plastic mix or granules, which will enable the manufacture of continuous sheeting substantially free of air pockets or voids.

Another object of this invention is to provide a plastic forming apparatus wherein polished endless steel belts can be employed to squeeze hot plastic extruded stock into sheet-like form and wherein the flattened sheet can be readily stripped from the belts.

Still another object of this invention is to provide in plastic forming machinery an improved plastic extruder which especially lends itself for cooperation with sheet forming elements or belts.

In accordance with the general features of this invention, there is provided in a plastic forming apparatus an upwardly inclined conveyor for carrying upwardly synthetic plastic granules through a heated area for thoroughly drying the plastic, a heated extruder at the upper end of the conveyor into which the dried plastic is delivered, the extruder having a downwardly discharging nozzle and cooperable endless polished conveyor belts directly below the extruder nozzle for receiving hot plastic stock therefrom and for pressing the plastic into sheet-like form.

Another feature of the invention relates to the manner in which the endless plastic sheet forming belts are suspended from driven rolls as well as to the manner in which the belts are maintained in relatively taut vertical positions.

Another feature of the invention relates to the use of weighted rolls at the lower ends of the plastic pressing endless belts together with means for raising the rolls so that the belts can be removed endwise off of the same and off of the upper rolls driving the belts and from which the belts are normally suspended.

Still another feature of the invention relates to so forming the extruder nozzle that it extends laterally or at right angles from the axis of the torpedo or spiral rod of the extruder whereby hot plastic can be delivered directly between the cooperating upper turns of the endless belts and immediately above the area where the belts are pressed together by the upper power driven rolls carrying the belts.

Yet another object of the invention relates to the provision of guide means for maintaining substantial portions of the downwardly traveling legs of cooperating endless conveyors in close parallel relation with the plastic sheet pressed therebetween.

Other objects and features of this invention will more fully appear from the following detailed description taken in connection with the accompanying drawings which illustrate a single embodiment thereof, and in which Figure 1 is a fragmentary plan view, partly in section, of a plastic manufacturing plant containing a series of banks of plastic forming equipment, each embracing the features of this invention and showing how the raw plastic is fed from a lower floor or level to an upper floor, where it is discharged into an extruder and from the extruder into the sheet forming equipment depending downwardly from the upper level;

Figure 2 is an enlarged fragmentary plan view of one of the plastic forming units or banks shown in Figure 1;

Figure 3 is a front side view of the equipment shown in Figure 2;

Figure 4 is a left hand side view of the equipment shown in Figure 2;

Figure 7 is an enlarged fragmentary sectional view taken on substantially the line VII—VII of Figure 5 looking in the direction indicated by the arrows;

Figure 8 is a sectional view taken on the line VIII—VIII of Figure 3 looking downwardly, showing the guide rolls which are disposed above the lower weight applying rolls for holding the belts together at a point directly above the lower discharge end of the belts;

Figure 9 is a fragmentary sectional view taken on substantially the line IX—IX of Figure 2, looking in the direction indicated by the arrows and showing the discharge nozzle end of the plastic extruder;

Figure 1:
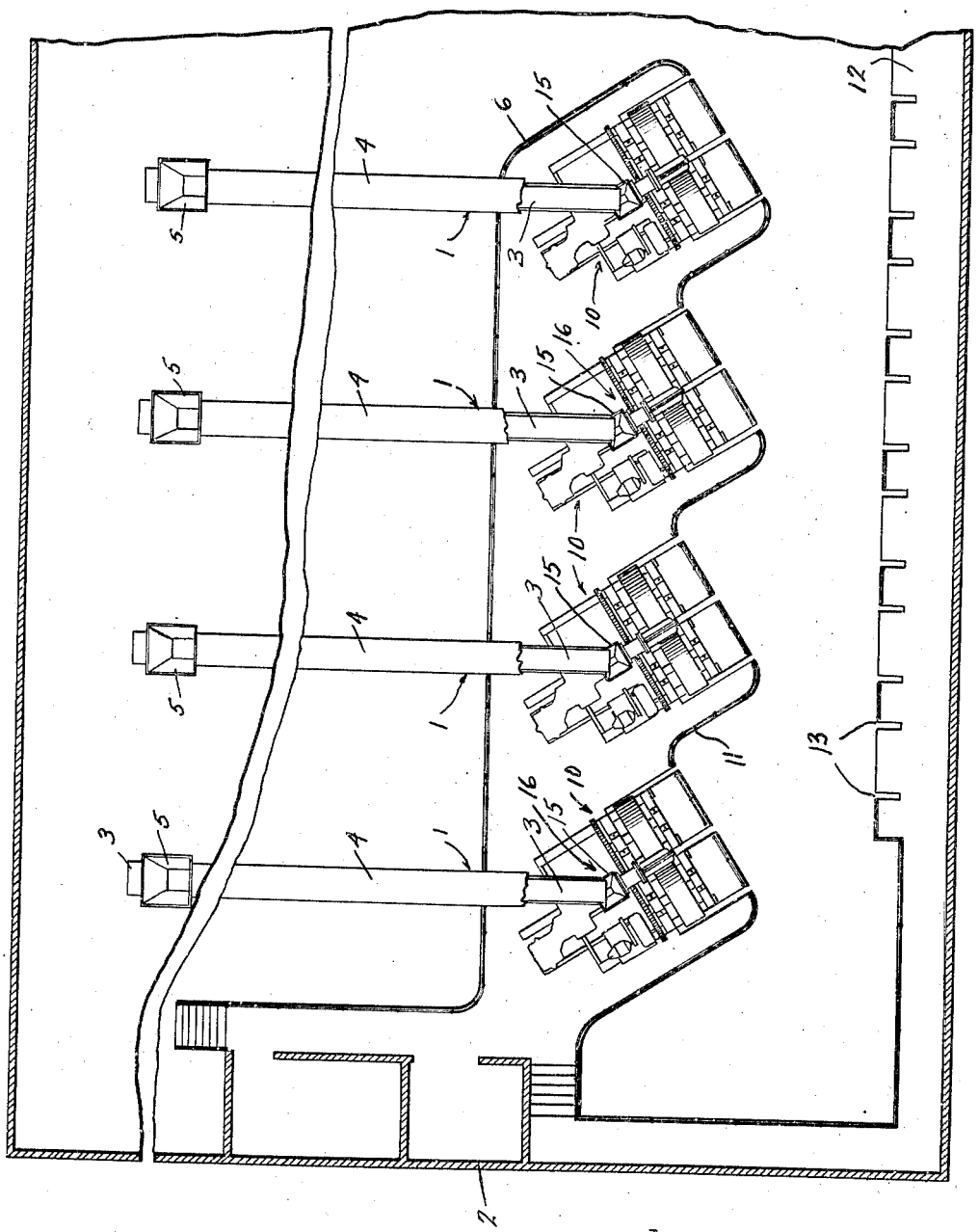

Figure 10 is a fragmentary cross-sectional view taken on the line X—X of Figure 2 looking in the direction indicated by the arrows and showing how the extruder nozzle projects downwardly between the upper rolls so as to be in close proximity to the point where the rolls converge and move the legs of the belts into engagement with each other; and Figure 11 is a fragmentary plan view of a portion of plastic sheet formed by the endless belts of my novel apparatus.

As shown on the drawings:

The reference character 1 designates generally a plastic fabricating unit or bank which can be repeated as many times as is desired consistent with the size of the building 2 housing the same. These units 1 are identical in construction and are arranged side-by-side within the building. Each unit includes an upwardly inclined endless conveyor 3 extending from a lower or first floor of the building upwardly through a heating chamber 4. Each of these conveyors may be of any suitable or conventional construction, although it is contemplated that the actual belting may comprise a closely woven fabric webbing on which the particles of plastic can be carried without falling through the webbing. Other suitable materials may be used with equal effectiveness.

This chamber 4 may be heated by any suitable means, such, for example, as infra red lights, steam and the like. The conveyor must be sufficiently long so that the plastic granules fed upwardly thereon will have adequate time to become completely dry before being discharged from the upper end of the inclined conveyor 3.

Also the end of each conveyor located on the first floor has suitably carried over it a hopper 5 into which plastic granules of predetermined composition are progressively delivered to the conveyor. Either manual or mechanical means (not shown) may be employed for feeding the synthetic plastic to the conveyor.

It will be noted that adequate room is provided at the lower end of each of the conveyors for accommodating bins or supply containers of the plastic ingredients to be used in the fabrication of the sheet. It is contemplated that excellent results may be obtained by using any one of the well known thermoplastics, such for example, as ethyl cellulose, cellulose acetate and vinyl resins, etc.

The upper end of the long conveyor 3 extends upwardly over a second floor platform 6 and is arranged to discharge into a sheet forming unit designated by the reference character 10. These units 10 are all identical in construction and are preferably staggered on the platform 6. The frame edge of the platform 6 is of a step-like formation 11 so as to facilitate access to the conveyor rolls, to be hereinafter described, when it is desired to remove the endless conveyor belts therefrom.

The second floor platform 6 is so laid out as to enable easy access by the operators to each of the units 10 without interference. The building may be provided with a gang-way 12 notched out at given intervals. Each set of notches 13 is spaced a distance corresponding to the spacing between the legs of each steel belt, to be hereinafter described, so that the belts may be inserted in the notches with the upper loops above the gang-way 12 and whereby the belts can be suspended temporarily downwardly from this gang-way 12. In this manner an extra supply of belts can be maintained on hand at all times for replacing the belts in each of the units when such replacements become necessary.

The upper end of each of the conveyors is so located as to discharge directly into the hopper 15 of a plastic extruding machine, designated generally by the reference character 16 (Figs. 2, 4 and 9). This extruding machine with the exception of the nozzle or discharge end thereof, may be of any suitable and well known construction now on the market. As best shown in Figure 9, each extruder includes a housing 17 through and from which projects a so-called torpedo rod 18 having spiral fins 19 for advancing plastic through a polished tube structure 20. The outer end of the torpedo rod 18 is journalled at 21 in a two-piece nozzle head 22—22. This head 22—22 is suitably heated as by means of jackets 23 or the like; and it should be noted in this respect that the main housing 17 may likewise be suitably heated as is the conventional practice in the extruding art. In other words, the dry plastic mix introduced in the extruder 16 must be heated to render it fluid or flowable. While any heating medium may be employed for raising the temperature of the plastic to a temperature, as, for example of 400° F. depending upon the type of plastic used, I preferably contemplate using steam.

Any suitable means may be employed for holding the two-piece head of the nozzle together, such, for example, as the bolts 24 (Figure 10).

The central polished tube structure 20 of the extruder is formed in the head 22 with a laterally or downwardly facing opening 25 from which the extruded plastic is forced through a so-called breaker or perforated plate 26. This plate may be supported in any suitable manner in the two nozzle head halves 22-22. Immediately after being forced through the breaker strip, the plastic is discharged into a downwardly depending opening 27 in head 22 laterally in a plane with the axis of the torpedo rod 18. This opening (Fig. 10) has a thickness corresponding to the thickness of the stock which is desired to be delivered to the sheet pressing roll belts to be hereinafter described.

It will be noted that the lower converging portions of the two nozzle head halves 22-22 are reduced in sections so as to fit down between the cooperating rolls 30-30 to be hereinafter described, and between which extruded stock 29 is delivered (Fig. 10). It is over these rolls that endless stainless steel belts 31—31 are trained, as I shall describe hereinafter.

I also contemplate that the extreme lower end 28 of the nozzle may be suitably heated as by means of electric coils 32, or the like, so that just prior to the discharge of the plastic, it is given an extra amount of heat to insure that the stock will be hot when delivered in contact with the engaging loops of the belts 31—31.

It will be noted from Figure 2 that the extruder 16 and its hopper 15 are suitably carried by a heavy steel frame work 35, which may comprise angle arms and other easily obtainable steel structures. The torpedo rod or shaft of the extruder 16 is driven by a motor 36 through suitable reducing gearing 37; both the motor and bearing being carried on the framework 35.

Each of the rolls 30—30 has a shaft 32 suitably journaled in bearings on the framework 35 and driven through a train of meshing gears designated generally by the reference character 39, which gearing is in turn driven by a motor 40 through a suitable reduction gearing 41. Any suitable gearing or drive for these rolls may be employed and for that reason no detailed description of the gearing illustrated in Figures 2 and 4 is thought to be necessary. Any suitable means may be employed for heating the hollow metal rolls or drums 30, although I contemplate employing steam for this purpose.

One principal aspect of my invention relates to the use of suspended cooperable endless belts 31 for the fabrication of the plastic sheeting. Each of these belts may be made of any suitable 18.8 steel or stainless steel, and is made of such gauge stock that the belting will easily move around the bends at its extremities and still be sufficiently self-sustaining as to form as to enable the squeezing of flat sheet between the belts. In order for the belts not to run off of the drums 30 they must be accurately made and must run true in use.

The rolls 30—30 are driven in opposite directions, as indicated by the arrows, in Figure 3, so as to move the inner or facing legs of the belts 31 downwardly. This drive of the rolls 30—30 is effected by reason of the arrangement of the gearing 39, shown in Figure 2, from which figure it will be perceived that the two rolls have meshing gears that are driven from the motor 40.

The downwardly moving legs of the two belts are so held by the rolls 30 that a space is provided between these legs corresponding to the thickness of the plastic sheet desired. This distance can be adjusted by moving one of the rolls to and from the other, and in Figure 3 I have shown a roll 30 as being provided with an adjustable screw device 42 acting on an end of a bearing for bodily moving the bearing 32 and the roll. This adjusting device may be of any suitable construction, and such devices for moving rolls on endless belts are common in the belt field. One of these devices should be provided for each of the bearings at the end of the right hand drum or roll shown in Figure 3.

The two cooperating endless belts 31—31 depend from or are suspended from the driving rolls 30—30 and may be suitably weighted at the lower ends so as to tend to hold the belts in vertical positions. For this purpose I contemplate the use of weighting rolls or drums 45—45 at the lower loops or bends of the two belts. These drums or rolls 45 do not in any way drive the belts but merely serve to weight them and to thus tend to hold the belts relatively taut and true. In other words, these rolls rest in the lower loops of the two belts so that their weight is effective to pull the belts downwardly and tightly against the upper driving rolls 30—30. They may be made of a larger diameter than the rolls 30, as shown in Figure 3, as it is not necessary at the lower extremities of the belts to have their legs spaced the same distance apart as at the upper ends. This reduces the extent of the bend of each of the belts at its lower end.

Figure 5:
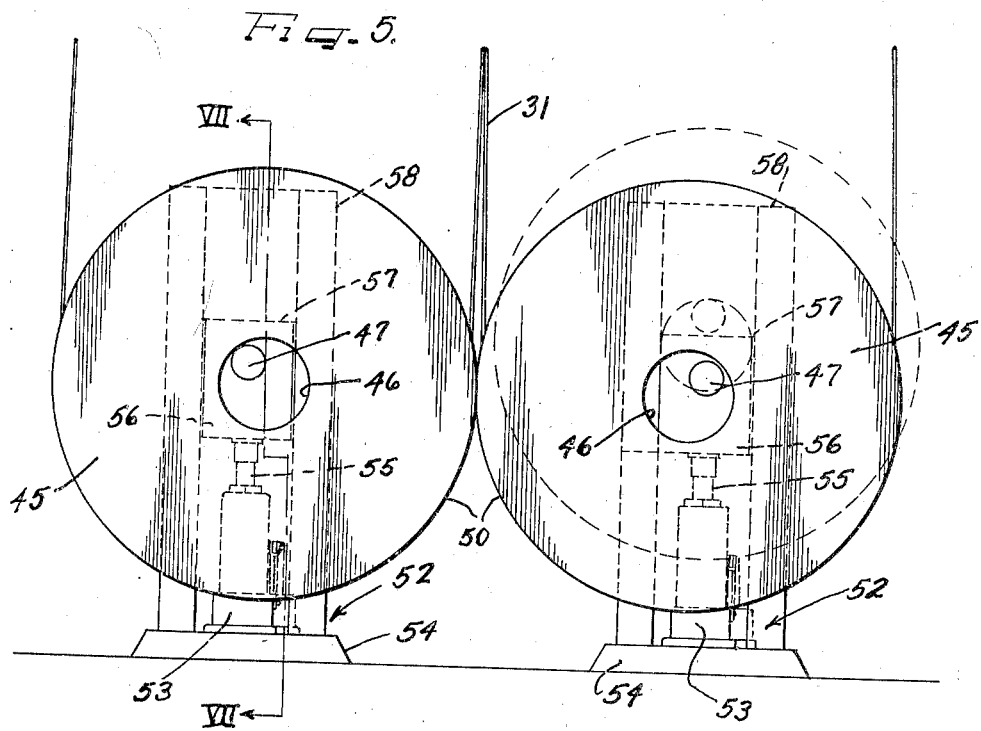
Figure 5 is an enlarged end view of the rolls for weighting the lower ends of the vertical sheet pressing belts and showing by dotted lines how one of the rolls can be jacked upwardly when it is desired to remove the weight from the belt so that it may be slipped endwise off of the roll and off of the upper power driven roll shown in Figure 3.
Figure 6:
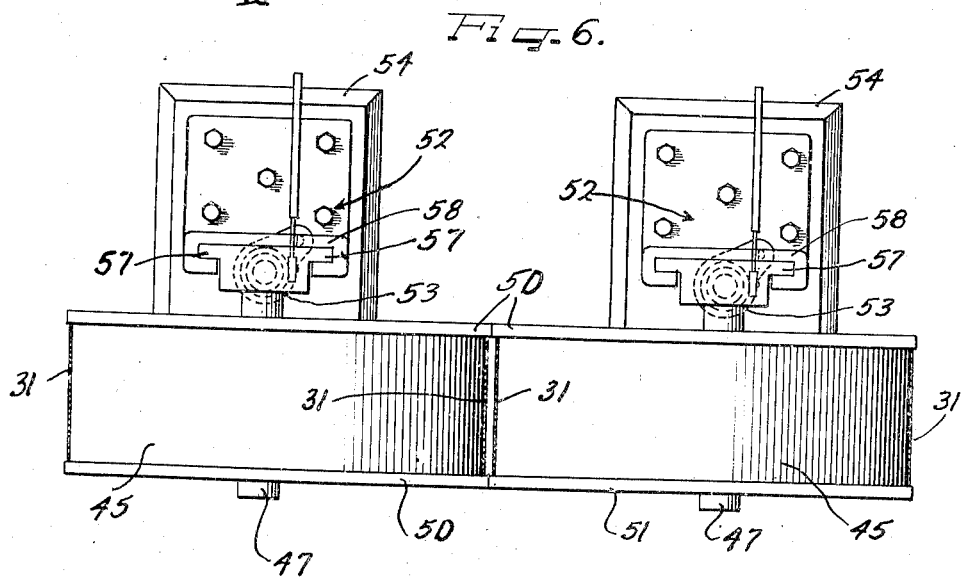
Figure 6 is a plan view of the structure shown in Figure 5.

As best shown in Figures 5, 6 and 7, means is provided for raising each of the drums 45—45 out of engagement with the lower loop of each of the belts when it is desired to remove a belt from the machine. Referring to these figures it will be perceived that each drum 45 is formed hollow and has its side flanges provided with aligned axial shaft openings 46—46. Projected in these openings is a fixed shaft or rod 47 on which the roll or drum 45 is adapted to turn. The axial openings 46 are of a substantially larger diameter than that of the shaft 47; and as a consequence, the drum in turning rolls around the periphery of the pin-like fixed shaft 47.

In order for the two drums 45 to turn together they are flanged, as indicated at 50, with the flanges on one drum engaging the flanges on another, as is clearly shown in Figure 6. The belt 31 on each drum is seated between the spaced side flanges 50—50, as is shown in Figure 7. Thus as the belts 31 are driven by the upper rolls or drums 30, the lower drums 45—45 will revolve in opposite directions and at the same time weight the lower ends of the endless belts.

In the repeated use of a belt 31, it may become necessary to remove it for cleaning or replacement. In order to enable this removal, I provide each drum 45 with means for raising it, designated generally by the reference character 52. This means comprises a hydraulic jack 53 of any suitable or conventional construction, carried on a base 54 (Figure 7). The ram 55 of the jack engages a block 56 formed integral with one end of the shaft 47. In addition, in order to guide the upward movement of the block 56, this block is provided with a side flange 57 (Figures 6 and 7) seated and riding in a grooved guide rail 58. The guide rail may be rigidly supported in any suitable manner as by attachment to the base 54.

In Figures 5 and 7 I have illustrated in dotted lines how one of the drums 45 can be moved from a normal, full lined, position to an upper dotted release position. When the lower drum or roll 45 is thus raised, the lower end of the belt is left dangling and can be easily slipped endwise off of the drum. Thereafter the upper end of the belt can be likewise slipped off of its driving roll 30.

It will be appreciated that when this displacement of the belt is effected, no plastic will be present between the belts so that the belts are not in tight engagement with each other at their upper portions. This is made possible by reason of the fact that the belts have been previously adjusted so as to be spaced a distance corresponding to the thickness of the desired plastic sheet as previously described.

Upon removal of the belt it may be carried by a suitable crane (not shown) and inserted in a pair of notches 13 on the supporting track-way 12 (Figure 1) previously described. A new belt can then be slipped endwise over the driving drum 30 and then positioned around the raised lower drum 45. Thereafter the hydraulic jack is released in the usual manner and the coresponding roll 45 is permitted to seat on the inner surface of the lower bend of the belt for weighting the belt in the manner described.

It should be noted that while I have illustrated a hydraulic jack 53 for raising the drum 45, which jack may be of any conventional construction, any other suitable elevating means may be employed for this purpose.

In the operation of my machine, it is desirable that major lengths of the downwardly moving legs of the two belts 31—31 be maintained in close cooperation, since, if they tend to pull away from each other, the plastic sheeting might be detrimentally effected and might not have adequate time to set. It is, of course, clear that as the formed plastic sheet (Figure 3) travels downwardly between the downwardly moving legs of the belts 31, it is being cooled and is taking a set. For this reason I find it desirable to provide some means directly above the drums 45 for insuring parallelism of the downwardly moving inner legs of the two belts. This means comprises fixed parallel rollers 60—60 (Figures 3, 4 and 8) positioned to engage the two downwardly moving legs of the belts 31 and to hold the legs in close parallel relationship with the formed plastic sheet discharged therebetween. I have illustrated roughly such a plastic sheet 61 in Figure 11, as well as in Figure 8.

The two guide rollers 60—60 are journaled on shafts 62—62 carried by an auxiliary frame structure 63 attached to the main frame structure 35 in any suitable manner. Any suitable supporting means may be provided for carrying the rotatable guide rollers 60—60.

It will also be perceived from Figure 8 that the spacing between the guide rollers 60 is such that when there is no plastic sheet 61 between the belts 31—31, the belts can be easily slipped endwise from between the rollers 60 as described hereinbefore.

While in Figures 3 and 4 I have not illustrated any cooling means for the plastic other than the air itself, it is, of course, evident that should supplemental cooling means be desired, the same can be easily applied to the frame work 35 above the guide rollers 60—60.

In the use of this apparatus synthetic plastic mix is continuously fed upwardly by the endless conveyor 3 and dumped into the hopper 15 of the extruding machine 16. This machine heats the plastic and extrudes it from the lateral nozzle opening 27 (Figures 9 and 10) directly between the downwardly moving legs of the two endless stainless steel belts 31—31. The adjusted distance between the driving rolls 30—30 for the belts is such that the plastic stock 29 in passing between the rolls is tightly pressed and flattened into polished sheet form. In addition, by reason of the close proximity of the discharge end of the extruder to the point of application of pressure to the plastic by the rolls, there is very little opportunity for the plastic to become cooled before being flattened. Supplemental heating means can, of course, be used, such as the heat coils 28 in the discharge end of the extruder 16 (Figure 10), previously described.

After the plastic has been flattened from the stock 29 into the sheet-like form 61, it is moved downwardly between the cooperating legs of the belts 31 toward the lower or discharge end of the belts. During the course of this travel, the guide rollers 60—60 hold the belt legs in tight engagement with the flattened plastic so that the plastic has ample time to take a set as it is cooled.

The belts are maintained in a true taut condition by reason of the weight applied by the drums 45 so that there is little opportunity for the plastic to become distorted as it is being cooled.

At the lower bends of the belts, namely, at the drums 45, the plastic emanates from the junction of the drums and may be suitably stripped from the belts, and led away by any other suitable means (not shown) to article forming stations or to a storage area.

Attention is also directed to the fact that the rate at which the stock is discharged from the extruder 16 is predetermined with relation to the speed of the drums 30 and the belts 31.

For instances in some cases it may be desirable to have the rolls 30 turn at such a speed that a slight pull is exerted thereby on the stock 29. This would be advantageous in that it would tend to prevent any pile-up of the plastic stock between the rolls.

I claim as my invention:

1. In combination in plastic forming apparatus for making sheet-like material as a continuous process, a pair of forming rolls located on parallel axes in a horizontal plane and spaced apart at their nearest approach, a forming belt trained over each of the rolls, means for activating at least one of the rolls to move rotatably toward the opposite roll, the belts being suspended from the rolls and hanging freely, and a weighting roll cradled in the lower loop of each of the rolls and acting to maintain the belts taut and in proximity to one another in their downwardly moving runs, said weighting rolls being flanged radially outwardly at their periphery and the flanges being in mutually rolling relation where they come together.

2. In combination in plastic forming apparatus for making sheet-like material as a continuous process, a pair of forming rolls located on parallel axes in a horizontal plane and spaced apart at their nearest approach, a forming belt trained over each of the rolls, means for activating at least one of the rolls to move rotatably toward the opposing roll, the belts being suspended from the rolls and hanging freely, a weighting roll cradled in the lower loop of each of the rolls and acting to maintain the belts taut and in proximity to one another in their downwardly moving runs, said weighting rolls being flanged radially outwardly at their periphery and the flanges being in mutually rolling relation where they come together, said flanges being of a width to hold the principal periphery of the rolls spaced apart to a greater distance than the spacing between the upper belt supporting rolls, and means above said lower rolls for holding the belts to the spacing of the upper rolls to within a predetermined distance of the weighting rolls.

3. In combination in plastic forming apparatus for making sheet-like material as a continuous process, a pair of forming rolls located on parallel axes in a horizontal plane and spaced apart at their nearest approach, a forming belt trained over each of the rolls, means for activating at least one of the rolls to move rotatably toward the opposite roll, the belts being suspended from the rolls and hanging freely, a weighting roll cradled in the lower loop of each of the rolls and acting to maintain the belts taut and in proximity to one another in their downwardly moving runs, each of the rolls having a side opening, and means for lifting said weighting rolls to clear the same from the respective loops of the associated belts when it is desired to remove the belts therefrom, said means including an elongated lifting member normally projecting into said opening clear of contact with the roll with which associated but movable into lifting relation thereto.

4. In a plastic forming apparatus for converting plastic material into sheet form, a plastic extruder, means for supporting said extruder at a substantial elevation above a floor, a pair of closely spaced rolls supported on parallel axes by said supporting means adjacent to said extruder and extending endwise toward the front of the assembly, a pair of forming belts respectively looped over said rolls and arranged with respect to said extruder to receive plastic material therebetween at their general convergence about the rolls, means for actuating the rolls to drive the belts toward each other and downwardly at their convergence, tensioning rolls engaging the belts adjacent the floor and arranged to maintain the downward runs of the belts taut, the rolls and the supporting means being so related as to leave the front edges of the belts entirely free for removal of the belts and replacement thereof at the front of the machine endwise relative to the rolls after merely releasing the tension of the tensioning rolls.

5. In a plastic forming apparatus for converting plastic material into sheet form, a plastic extruder, means for supporting said extruder at a substantial elevation above a floor, a pair of closely spaced rolls supported on parallel axes by said supporting means adjacent to said extruder and extending endwise toward the front of the assembly, a pair of forming belts respectively looped over said rolls and arranged with respect to said extruder to receive plastic material therebetween at their general convergence about the rolls, means for actuating the rolls to drive the belts toward each other and downwardly at their convergence, tensioning rolls engaging the belts adjacent the floor and arranged to maintain the downward runs of the belts taut, the rolls and the supporting means being so related as to leave the front edges of the belts entirely free for removal of the belts and replacement thereof at the front of the machine endwise relative to the rolls after merely releasing the tension of the tensioning rolls, and means disposed at the inner ends of said tensioning rolls operable for releasing the rolls from belt tensioning and leaving the forward ends of the rolls entirely free for forward removal or replacement of the belts relative to such rolls.

6. In apparatus for making a continuous sheet of synthetic thermoplastic material, a supporting framework rising to a substantial height above a floor, a pair of parallel axes, heated forming rolls supported in cooperative closely spaced relation at the top of said framework, a pair of sheet metal endless forming belts looped over the respective rolls, and with the convergent portions thereof at the rolls maintained by the rolls in predetermined spaced relation to define the thickness of a sheet of plastic to be formed therebetween, means carried by the top of the framework for depositing thermoplastic material at the convergence of the belts, means for actuating the roll and belt assembly to drive the belts toward one another and downwardly at their adjacent sheet forming runs, the lower loops of the belts extending close to the floor, and means adjacent the lower ends of the down traveling runs of the belts for maintaining such runs under tension and close together while the formed plastic sheet travels downwardly therewith, the major extent of the downwardly traveling forming runs of the belts between said heated forming rolls and said tensioning means being free of support or compression and exposed for rapid heat transfer to cool the formed sheet therebetween for setting thereof so that the sheet will be self sustaining upon leaving the belts stripped therefrom at the lower loops of the belts.

7. In apparatus for making a continuous sheet of synthetic thermoplastic material, a supporting framework rising to a substantial height above a floor, a pair of parallel axes, heated forming rolls supported in cooperative closely spaced relation at the top of said framework, a pair of sheet metal endless forming belts looped over the respective rolls, and with the convergent portions thereof at the rolls maintained by the rolls in predetermined spaced relation to define the thickness of a sheet of plastic to be formed therebetween, means carried by the top of the framework for depositing thermoplastic material at the convergence of the belts, means for actuating the roll and belt assembly to drive the belts toward one another and downwardly at their adjacent sheet forming runs, the lower loops of the belts extending close to the floor, and means adjacent the lower ends of the down traveling runs of the belts for maintaining such runs under tension and close together while the formed plastic sheet travels downwardly therewith, the major extent of the downwardly traveling forming runs of the belts between said heated forming rolls and said tensioning means being free of support or compression and exposed for rapid heat transfer to cool the formed sheet therebetween for setting thereof so that the sheet will be self sustaining upon leaving the belts stripped therefrom at the lower loops of the belts, said tensioning means comprising tensioning rolls supported entirely by the lower loops of the belts and having radial marginal spacer flanges serving to hold the rolls against slipping from the belts and also riding upon one another to maintain the belts in predetermined spaced relation where the belts run over the tensioning rolls.

8. In apparatus for making a continuous sheet of synthetic thermoplastic material, a supporting framework rising to a substantial height above a floor, a pair of parallel axes, heated forming rolls supported in cooperative closely spaced relation at the top of said framework, a pair of sheet metal endless forming belts looped over the respective rolls, and with the convergent portions thereof at the rolls maintained by the rolls in predetermined spaced relation to define the thickness of a sheet of plastic to be formed therebetween, means carried by the top of the framework for depositing thermoplastic material at the convergence of the belts, means for actuating the roll and belt assembly to drive the belts toward one another and downwardly at their adjacent sheet forming runs, the lower loops of the belts extending close to the floor, means adjacent the lower ends of the down traveling runs of the belts for maintaining such runs under tension and close together while the formed plastic sheet travels downwardly therewith, the major extent of the downwardly traveling forming runs of the belts between said heated forming rolls and said tensioning means being free of support or compression and exposed for rapid heat transfer to cool the formed sheet therebetween for setting thereof so that the sheet will be self sustaining upon leaving the belts stripped therefrom at the lower loops of the belts, and a platform at the top of said framework for access to said forming rolls and the plastic delivering means.

9. In apparatus for making a continuous sheet of synthetic thermoplastic material, a supporting framework rising to a substantial height above a floor, a pair of parallel axes, heated forming rolls supported in cooperative closely spaced relation at the top of said framework, a pair of sheet metal endless forming belts looped over the respective rolls, and with the convergent portions thereof at the rolls maintained by the rolls in predetermined spaced relation to define the thickness of a sheet of plastic to be formed therebetween, means carried by the top of the framework for depositing thermoplastic material at the convergence of the belts, means for actuating the roll and belt assembly to drive the belts toward one another and downwardly at their adjacent sheet forming runs, the lower loops of the belts extending close to the floor, means adjacent the lower ends of the down traveling runs of the belts for maintaining such runs under tension and close together while the formed plastic sheet travels downwardly therewith, the major extent of the downwardly traveling forming runs of the belts between said heated forming rolls and said tensioning means being free of support or compression and exposed for rapid heat transfer to cool the formed sheet therebetween for setting thereof so that the sheet will be self sustaining upon leaving the belts stripped therefrom at the lower loops of the belts, said plastic material delivering means comprising a nozzle having an elongated orifice disposed parallel to said belts and located closely adjacent to the maximum convergence of the belts as they travel over the forming rolls for delivering between the belts a sheet-like stream of thermoplastic material.

10. In a plastic forming apparatus for converting plastic material into sheet form, a plastic extruder, means for supporting said extruder at a substantial elevation above a floor, a pair of closely spaced rolls supported on parallel axes by said supporting means adjacent to said extruder and extending endwise toward the front of the assembly, a pair of forming belts respectively looped over and hanging from said rolls and arranged with respect to said extruder to receive plastic material therebetween at their general convergence about the rolls, and means for actuating the rolls to drive the belts toward each other and downwardly at their convergence, the rolls and the supporting means being so related as to leave the front edges of the belts entirely free for removal of the belts and replacement thereof at the front of the machine endwise relative to the rolls.

11. In apparatus for making a continuous sheet of synthetic thermoplastic material, a supporting framework rising to a substantial height above a floor, a pair of parallel axes, heated forming rolls supported in cooperative closely spaced relation at the top of said framework, a pair of sheet metal endless forming belts looped over and hanging from the respective rolls, and with the convergent portions thereof at the rolls maintained by the rolls in predetermined spaced relation to define the thickness of a sheet of plastic to be formed therebetween, means carried by the top of the framework for depositing thermoplastic material at the convergence of the belts, means for actuating the roll and belt assembly to drive the belts toward one another and downwardly at their adjacent sheet forming runs, the lower loops of the belts extending adjacent to the floor, the major extent of the downwardly traveling forming run of the belts between said heated forming rolls and the lower loops being free of support or compression and exposed for rapid heat transfer to cool the formed sheet therebetween for setting thereof so that the sheet will be self-sustaining upon leaving the belts stripped therefrom at the lower loops of the belts.

12. In apparatus for making a continuous sheet of synthetic thermoplastic material, a supporting framework rising to a substantial height above a floor, a pair of parallel axes, heated forming rolls supported in cooperative closely spaced relation at the top of said framework, a pair of sheet metal endless forming belts looped over and hanging from the respective rolls, and with the convergent portions thereof at the rolls maintained by the rolls in predetermined spaced relation to define the thickness of a sheet of plastic to be formed therebetween, means carried by the top of the framework for depositing thermoplastic material at the convergence of the belts, means for actuating the roll and belt assembly to drive the belts toward one another and downwardly at their adjacent sheet forming runs, the lower loops of the belts extending adjacent to the floor, the major extent of the downwardly traveling forming runs of the belts between said heated forming rolls and the lower loops being free of support or compression and exposed for rapid heat transfer to cool the formed sheet therebetween for setting thereof so that the sheet will be self-sustaining upon leaving the belts stripped therefrom at the lower loops of the belts, and a platform at the top of said framework for access to said forming rolls and the plastic delivering means.

13. In apparatus for making a continuous sheet of synthetic thermoplastic material, a supporting framework rising to a substantial height above a floor, a pair of parallel axes, heated forming rolls supported in cooperative closely spaced relation at the top of said framework, a pair of sheet metal endless forming belts looped over and hanging from the respective rolls, and with the convergent portions thereof at the rolls maintained by the rolls in predetermined spaced relation to define the thickness of a sheet of plastic to be formed therebetween, means carried by the top of the framework for depositing thermoplastic material at the convergence of the belts, means for actuating the roll and belt assembly to drive the belts toward one another and downwardly at their adjacent sheet forming runs, the lower loops of the belts extending adjacent to the floor, the major extent of the downwardly traveling forming runs of the belts between said heated forming rolls and said tensioning means being free of support or compression and exposed for rapid heat transfer to cool the formed sheet therebetween for setting thereof so that the sheet will be self-sustaining upon leaving the belts stripped therefrom at the lower loops of the belts, said plastic material delivering means comprising a nozzle having an elongated orifice disposed parallel to said belts and located closely adjacent to the maximum convergence of the belts as they travel over the forming rolls for delivering between the belts a sheet-like stream of thermoplastic material.

GEORGE ALBERT LYON.

REFERENCES CITED

The following references are of record in the file of this patent:

UNITED STATES PATENTS

| Number | Name | Date |
|---|---|---|
| 1,327,721 | Mattison | Jan. 13, 1920 |
| 1,952,556 | MacFarlane | Mar. 27, 1934 |
| 2,075,735 | Loomis | Mar. 30, 1937 |
| 2,197,811 | Spinasse | Apr. 23, 1940 |
| 2,315,477 | Parkhurst | Mar. 30, 1943 |
| 2,319,859 | Hale | May 25, 1943 |
| 2,340,834 | Hanson | Feb. 1, 1944 |
| 2,407,503 | Magerkurth et al. | Sept. 10, 1946 |